US005514733A

United States Patent [19]

Ito et al.

[11] Patent Number: 5,514,733

[45] Date of Patent: May 7, 1996

[54] INK COMPOSITION FOR THERMAL TRANSFER, INK RIBBON FOR THERMAL TRANSFER, THERMAL TRANSFER TARGET SHEET AND THERMAL TRANSFER METHOD

[75] Inventors: Kengo Ito, Miyagi; Toshihisa Inoue, Kanagawa; Masanobu Hida, Tokyo; Motohiro Mizumachi, Miyagi, all of Japan

[73] Assignee: Sony Corporation, Tokyo, Japan

[21] Appl. No.: 284,693

[22] Filed: Aug. 12, 1994

[30] Foreign Application Priority Data

Dec. 14, 1992 [JP] Japan .................................... 4-333024

[51] Int. Cl.$^6$ .................................................... C09D 11/10

[52] U.S. Cl. ............................ 523/161; 524/43; 524/44; 524/366; 524/445; 524/449; 524/451

[58] Field of Search .............................. 523/161; 524/43, 524/44, 445, 449, 451, 366

[56] References Cited

U.S. PATENT DOCUMENTS

| | | | |
|---|---|---|---|
| 4,657,590 | 4/1987 | Gamblin | 106/22 |
| 4,664,671 | 5/1987 | Gregory | 8/471 |

FOREIGN PATENT DOCUMENTS

| | | |
|---|---|---|
| 0498267 | 1/1992 | European Pat. Off. . |
| 0506034 | 3/1992 | European Pat. Off. . |
| 2254613 | 12/1974 | France . |
| 60-83890 | 5/1985 | Japan . |
| 60-104390 | 6/1985 | Japan . |

*Primary Examiner*—Paul R. Michl
*Assistant Examiner*—John J. Guarriello
*Attorney, Agent, or Firm*—Hill, Steadman & Simpson

[57] ABSTRACT

An ink composition for thermal transfer using a basic dye, or a cationic dye, is disclosed. The ink composition for thermal transfer contains the basic dye and an organic high polymer, with the basic dye being dissolved or dispersed into the organic high polymer with a solubilizing agent compatible with both the basic dye and the organic high polymer. The solubilizing agent is an amphipathic compound, preferably, having an HLB value of 7 or greater. By forming an ink layer containing the ink composition for thermal transfer on a base, an ink ribbon for thermal transfer is formed. A thermal transfer target sheet having a receptor layer containing an interlayer compound substituted by an ion exchangeable with the basic dye and a binder resin is used. The ion exchangeable with the basic dye is exemplified by an organic ion, such as an organic onium ion. The ink layer of the ink ribbon for thermal transfer and the receptor layer of the thermal transfer target sheet are superposed to face each other, and the basic dye contained in the ink layer is transferred onto the receptor layer by heating.

5 Claims, 2 Drawing Sheets

INK COMPOSITION FOR THERMAL TRANSFER, INK RIBBON FOR THERMAL TRANSFER, THERMAL TRANSFER TARGET SHEET AND THERMAL TRANSFER METHOD

TECHNICAL FIELD

This invention relates to an ink composition for thermal transfer, an ink ribbon for thermal transfer, a thermal transfer target sheet and a thermal transfer method which are preferably adapted for an ink ribbon and a printing paper for a video printer.

BACKGROUND ART

A recent video printer forms an image by using an ink ribbon produced by dissolving a disperse dye into a hydrophobic high polymer and thermally transferring the dye contained in the ink ribbon onto a receptor layer applied on a transfer target material, such as synthetic paper, in accordance with image signals.

The disperse dye is employed herein for the following reason. Since the disperse dye is hydrophobic, it exhibits satisfactory dyeing property on the transfer target material and hence practical sensitivity on transfer.

However, when the disperse dye is used as the dye for the ink ribbon, it is difficult to assure fixation after printing.

Meanwhile, a basic dye, or a so-called cationic dye, having high visibility and coloring property peculiar to the basic material is known as a dye for dyeing acrylic fibers. It is proposed to use the cationic dye as a dye for the ink ribbon is proposed, as disclosed in the U.S. Pat. No. 4,664,671.

The cationic dye is known to exhibit excellent light fastness and wet coloring fastness on the acrylic substrate. However, since the cationic dye has hydrophilic property, it is difficult to disperse the cationic dye uniformly and stably into the hydrophobic high polymer, such as butyral resin, which is broadly used as a binder for the ink ribbon. In addition, there is no measure to fix the image in or after image formation.

To solve such problems, the present Applicant has proposed a technique of using a hydrophobic cationic dye for the ink ribbon while using an interlayer compound ion-exchangeable with the cationic dye and dissolved into a binder high polymer for the receptor layer of the printing paper, and then holding and fixing in the interlayer compound the cationic dye transferred into the receptor layer, in the JP Patent Kokai Publication No. 4-299183.

With this technique, however, it is necessary to make the cationic dye hydrophobic in advance by ion exchange using an organic anionic surface active agent. Thus, the production process of the ink composition and the ink ribbon is complex.

DISCLOSURE OF THE INVENTION

Thus, it is an object of the present invention to cause the basic dye, which has been unusable as an image forming material of the thermal transfer system, to be adaptable without accompanying complexity of the production process. It is another object of the present invention to provide an ink composition for thermal transfer, an ink ribbon for thermal transfer, a thermal transfer target sheet and a thermal transfer method by which it is possible to significantly improve sensitivity or density, hue, light fastness and fixation in the image formation.

The present inventor has found through intensive studies that the basic dye can be dispersed or dissolved similarly to the disperse dye into the organic high polymer by adding the basic dye to the organic high polymer along with a solubilizing agent. The present inventor has thus completed the present invention.

According to the first aspect of the present invention, there is provided an ink composition for thermal transfer including a basic dye and an organic high polymer, the basic dye being dispersed or dissolved into the organic high polymer with a solubilizing agent compatible with both the basic dye and the organic high polymer.

According to the second aspect of the present invention, there is provided an ink ribbon for thermal transfer using the ink composition of the first aspect of the present invention for an ink layer thereof. The ink ribbon for thermal transfer includes the ink layer containing the ink composition for thermal transfer including the basic dye and the organic high polymer, the basic high polymer being dispersed or dissolved into the organic high polymer, the ink layer being formed on a base.

The dye used for the ink composition for thermal transfer according to the present invention is the basic dye, that is, a cationic dye. The cationic dye is a water soluble dye having amine salt or a quaternary ammonium group, and is exemplified by an azo dye, a triphenylmethane dye, an azine dye, an oxazine dye or a thiazine dye. Any of these cationic dyes can be used in the present invention. Specifically, compounds expressed by the following Chemical Formulas 1 to 8 can be employed.

[Chemical Formula 1]

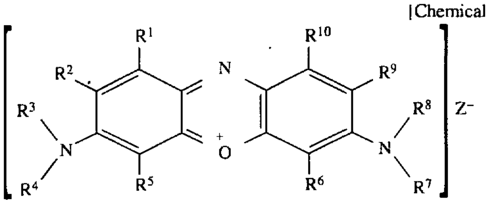

(In the above Formula, $R^1$ through $R^{12}$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $R^1$ and $R^2$, $R^3$ and $R^4$, $R^5$ and $R^6$, $R^7$ and $R^8$, $R^9$ and $R^{10}$, and $R^{11}$ and $R^{12}$ may be combined with each other to form rings, respectively. $Z^-$ expresses a counter ion.)

[Chemical Formula 2]

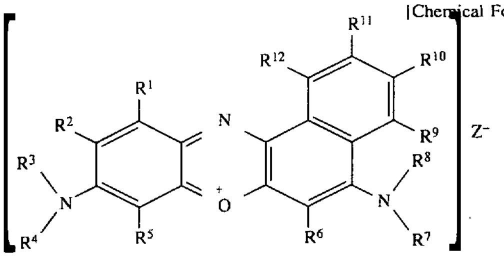

(In the above Formula, $R^1$ through $R^4$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $R^1$ and $R^2$, $R^3$ and $R^4$, $R^5$ and $R^6$, $R^7$ and $R^8$, $R^9$ and $R^{10}$, and $R^{11}$ and $R^{12}$ may be combined with each other to form rings, respectively. $Z^-$ expresses a counter ion.)

[Chemical Formula 3]

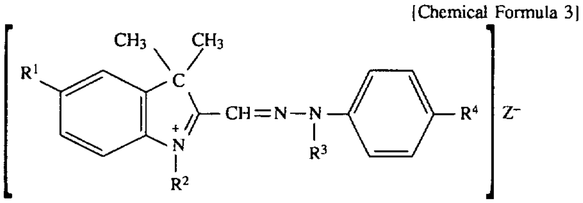

(In the above Formula, $R^1$ through $R^4$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $Z^-$ expresses a counter ion.)

[Chemical Formula 4]

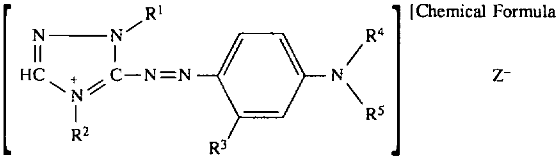

(In the above Formula, $R^1$ through $R^5$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $R^4$ and $R^5$ may be combined with each other to form a ring. $Z^-$ expresses a counter ion.)

[Chemical Formula 5]

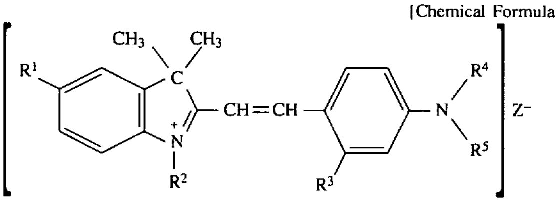

(In the above Formula, $R^1$ through $R^5$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $R^4$ and $R^5$ may be combined with each other to form a ring. $Z^-$ expresses a counter ion.)

[Chemical Formula 6]

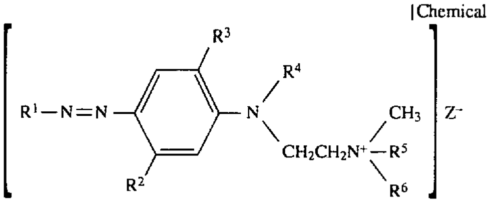

(In the above Formula, $R^1$ is substituted or non-substituted aryl group, or substituted or non-substituted heterocyclic group. $R^2$ and $R^3$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group, acyl group or acylamino group. These groups are substitutable. $R^4$ is substituted or non-substituted alkyl group. $R^5$ and $R^6$ are independently hydrogen atom, substituted or non-substituted alkyl group, or substituted or non-substituted aralkyl group. $R^5$ and $R^6$ may be combined with each other to form a ring. $Z^-$ expresses a counter ion.)

[Chemical Formula 7]

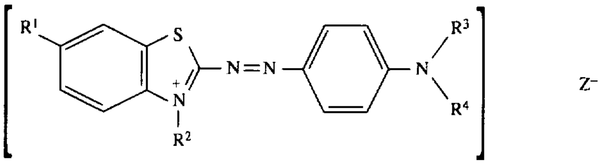

(In the above Formula, $R^1$ through $R^4$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $R^3$ and $R^4$ may be combined with each other to form a ring. $Z^-$ expresses a counter ion.)

[Chemical Formula 8]

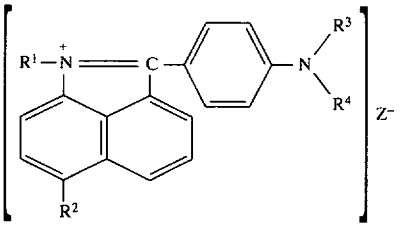

(In the above Formula, $R^1$ through $R^4$ are independently hydrogen atom, halogen atom, cyano group, alkyl group, cycloalkyl group, alkoxy group, aryl group, aryloxy group, aralkyl group, aralkoxy group, alkenyl group, alkenoxy group, alkoxycarbonyl group, acyloxy group or acyl group. These groups are substitutable. $R^3$ and $R^4$ may be combined with each other to form a ring. $Z^-$ expresses a counter ion.)

Furthermore, C.I. Basic Yellow 21, 36, 67 and 73 are usable.

The counter ions of these basic dyes are inorganic ions, exemplified in this case by halogen ion, perchlorate ion, boron fluoride ion or sulfate ion.

As the organic high polymer, any thermoplastic resin used as the binder resin for the ink composition of this type can be employed. For instance, polyvinylbutyral, hydroxypropyl cellulose and ethyl hydroxyethyl cellulose can be employed.

The cationic dye is normally water soluble. Consequently, the cationic dye cannot be uniformly dispersed simply by mixing the cationic dye with the organic high polymer. Thus, in the present invention, by using a solubilizing agent which is compatible with both the cationic dye and the organic high polymer, the cationic dye is dispersed or dissolved into the organic high polymer.

The solubilizing agent is preferably a so-called amphipathic compound having compatibility with both the cationic dye and the organic high polymer and exhibiting an HLB value of not smaller than 7.0. The HLB value is a quantitative expression of the hydrophile-lipophile balance. A smaller HLB value indicates intense lipophilic property, while a larger HLB value indicates intense hydrophilic property. In the present invention, if the solubilizing agent has an HLB value of smaller than 7.0, the lipophilic property is excessively intense, losing the compatibility with the cationic dye. Therefore, it is difficult to disperse the cationic dye uniformly into the organic high polymer. Although the upper limit of the HLB value is not particularly set, it should be 90 or smaller because an excessively large value indicates insufficient compatibility with the organic high polymer.

The ink ribbon for thermal transfer is produced by forming the ink layer containing the ink composition on the base.

The ink layer may contain other components, if necessary, such as a transfer temperature adjusting agent, a plasticizer, a caking additive, and a pigment or a dye other than the cationic dye. The solubilizing agent may have such functions instead.

The ink layer is applied onto a suitable base. As the base, a polyethylene terephthalate film, a polyamide or so-called nylon film, a triacetyl cellulose film, a moisture-proof cellophane, a condenser paper, a thin paper or a fabric can be employed.

When thermal transfer is carried out using the above-described ink composition or ink ribbon for thermal transfer, the fixation of the basic dye is insufficient. Thus, the interlayer compound ion-exchangeable with the cationic dye and dispersed into the binder high polymer is used for the receptor layer of the thermal transfer target sheet, and the cationic dye transferred onto the receptor layer is held and fixed in the interlayer compound by ion exchange. This provides the third and fourth aspects of the present invention.

According to the third aspect of the present invention, there is provided a thermal transfer target sheet having a receptor layer containing an interlayer compound substituted by ions exchangeable with the basic dye and a binder resin. The thermal transfer target sheet is used for thermally transferring thereto the ink composition for thermal transfer including the basic dye and the organic high polymer, the basic dye being dispersed or dissolved into the organic high polymer with a solubilizing agent compatible with both the basic dye and the organic high polymer.

According to the fourth aspect of the present invention, there is provided a thermal transfer method for carrying out thermal transfer using the ink ribbon of the second aspect of the present invention and the thermal transfer target sheet of the third aspect of the present invention. The thermal transfer method includes superposing the ink ribbon and the thermal transfer target sheet with the ink layer and the receptor layer to face each other, and transferring the basic dye contained in the ink layer onto the receptor layer by heating.

The interlayer compound used for the thermal transfer target sheet is exemplified by a clay mineral having a layer structure and an exchangeable cation between layers. Specifically, a smectite based clay mineral represented by a montmorillonite group mineral can be employed.

The montmorillonite group mineral is a clay mineral expressed by the following general formula:

$$(X, Y)_{2-3}Z_4O_{10}(OH)_2.mH_2O.(W_{1-3})$$

where X=Al, Fe (III), Mn (III), Cr (III); Y=Mg, Fe (II), Mn (II), Ni, Zn, Li; Z =Si, Al; W=K, Na, Ca. $H_2O$ expresses the interlayer water, and m expresses an integer.

There are a variety of montmorillonite group minerals as natural products depending upon the combination of X and Y and the difference in the number of substitutions, such as montmorillonite, magnesian montmorillonite, iron montmorillonite, iron magnesian montmorillonite, beidellite, aluminum beidellite, nontronite, aluminum nontronite, saponite, aluminum saponite, hectorite and sauconite. In addition to these natural products, a synthetic product expressed by the above formula with OH group substituted by fluorine is available in the market.

Also, mica group minerals, such as sodium silicic mica, sodium taeniolite and lithium taeniolite, can be used other than the above montmorillonite group minerals. However, kaolinite, talc and pyrophyllite having a layer structure but not having ion-exchangeable cations between layers are inappropriate. Although zeolite has an alkali metal ion or an alkali earth metal ion as the ion-exchangeable cation, it has a mesh structure with a small pore size and is therefore slightly inferior in performance.

These interlayer compounds are bonded with organic cations between the layers by ion exchange. The preferred organic ions are organic onium ions, such as a quaternary ammonium ion and a substituted phosphonium ion, for example, an alkyl phosphonium ion and an aryl phosphonium ion. In the quaternary ammonium ion, four alkyl groups need to have not less than four carbons, preferably not less than eight carbons. With a small number of long-chain alkyl, the interlayer distance cannot be sufficiently assured, and the exchangeability with the dye may be insufficient.

The organic ion enlarges the interlayer distance of the interlayer compound and changes the originally hydrophilic interlayer portion of the interlayer compound to be hydrophobic with a hydrophobic chain thereof, thus making the interlayer compound compatible with a variety of organic compounds, particularly with the binder high polymer in this case. Accordingly, by bonding the organic cation, such as the quaternary ammonium ion or the substituted phosphonium ion, with the interlayer compound by ion exchange, the interlayer compound is provided with ion exchangeability with the cation dye and is caused to have non-aqueous solvent swelling property.

By mixing and dispersing the interlayer compound having the ion exchangeability with the cation dye and the non-aqueous solvent swelling property into the binder high polymer, and applying the interlayer compound swollen in the binder high polymer onto the base to form a film, the receptor layer is formed. Thus, the thermal transfer target sheet, that is a so-called printing paper, is produced.

The base may be arbitrarily formed of paper, a synthetic paper, a plastic film, a metallic plate, metallic foil or a plastic film with aluminum vapor-deposited thereon.

As the binder high polymer, a wide variety of general thermoplastic resin can be used. However, the resin containing a substituent obstructing the fixation, such as an ammonium group which is easier to ion-exchange between clay layers than the cation dye, is not preferred.

It is preferred that the amount of addition of the interlayer compound provided with the ion exchangeability is 5 to 90% by weight of the solid component of the receptor layer. The lower limit of the amount of addition is prescribed in accordance with the fixing capability. The amount of addition of less than 5% by weight may cause insufficient fixation effect. The upper limit is prescribed in accordance with the practical property of film formation. The amount of addition exceeding 90% by weight prevents satisfactory and flexible film formation.

Since the thermal transfer target sheet of high brightness are preferred in some cases, a fluorescent brightener may be added into the receptor layer. The interlayer compound of original high brightness, such as synthetic mica, may also be used.

It is also permissible to add a plasticizer to the receptor layer to control the glass transition point Tg of the binder high polymer, or to add an auxiliary additive for other purposes, as long as the plasticizer and the additive do not obstruct the fixation.

In image formation, the ink layer of the ink ribbon for thermal transfer is superposed on and bonded to the receptor layer of the thermal transfer target sheet or the printing paper, and the ink ribbon is thermally stimulated by a thermal head selectively in accordance with the image signal. To form a color image, ink ribbons of primary colors, that is, Yellow, Magenta and Cyan, are used each for the above operation. The measure for thermally stimulating the ink ribbon is not limited to the thermal head. Any conventional measure proposed in the thermal transfer system can be employed.

In the above-described thermal transfer, since the cationic dye is hydrophilic, the fixation efficiency is lower than in the case where the hydrophobic cationic dye is used, and the unfixed dye is likely to remain in the receptor layer. The unfixed dye in the receptor layer is considered to be a molecular aggregate in the state of pigment having molecules or associated bodies which have not been able to reach the ion bonding portion of the interlayer compound. As diffusion of the unfixed dye is promoted or the association is released by re-dissolving the unfixed dye, the collision rate with the ion bonding portion increases. Consequently, perfect fixation can be obtained.

Thus, it is preferable to dissolve the cationic dye after its transfer and to soak the swelling agent for swelling the interlayer compound and the binder resin into the receptor layer. However, if the swelling agent dissolves a receptor layer component and particularly the binder resin, a flow or bleeding of the image is caused. Therefore, a solvent which has high solubility of the dye and only swells the interlayer compound and the binder resin is preferred. Consequently, the swelling agent can be suitably selected in accordance with the type of the binder resin. For instance, toluene is preferred if the binder resin is polyvinylbutyral. Also, an aromatic plasticizer, such as phthalic ester, and an aromatic solvent, such as xylene, can be used.

The basic dye or the cationic dye is hydrophilic, and is therefore cannot be dispersed uniformly into the organic high polymer.

In the present invention, the solubilizing agent which is compatible with both the basic dye and the organic high polymer is used. Simply by adding this solubilizing agent, the basic dye becomes more compatible with the organic high polymer and is dispersed or dissolved uniformly into the organic high polymer.

In addition, the solubilizing agent is considered to be transferred onto the receptor layer of the thermal transfer target sheet, such as the printing paper, simultaneously with the thermal transfer of the dye, and is also considered to promote the thermal transfer of the dye. The synergistic effect of these operations enhances the thermal transfer of the basic dye which has been conventionally difficult to use, to the practical level. Thus, a high definition image is produced.

Meanwhile, the interlayer compound, for example, a smectite based clay mineral, is contained in the receptor layer of the thermal transfer target sheet of the present invention. The smectite based clay mineral has a layer structure in which a three-layer structure having a regular octahedron framework is repeated, and holds interlayer water and alkali metal ions as the ion-exchangeable cations between layers. The state of the smectite based clay mineral is shown in FIG. 1.

An untreated smectite based clay mineral 1, for example synthetic saponite, holds a sodium ion 2 as the ion-exchange cation between layers. The interlayer distance at this point is expressed by $d_1$.

If the smectite based clay mineral 1 is swollen with water to actuate an organic ion, such as, a quaternary ammonium ion 3, the quaternary ammonium ion 3 instead of the sodium ion 2 is taken in between layers.

The interlayer distance at this point expressed by $d_2$ is greater than the interlayer distanced $d_1$ of the untreated smectite based clay mineral, and the interlayer portion of the distance $d_2$ is provided with the ion exchangeability. This state is shown in FIG. 2.

If the basic dye is thermally transferred onto the receptor layer containing the smectite based clay mineral in this state, the above-mentioned solubilizing agent so operates that the basic dye is dissolved into the receptor layer and intrudes between layers.

Then, ion exchange occurs between the quaternary ammonium ion 3 and the basic dye 4, and the basic dye 4 is taken in between layers of the smectite based clay mineral 1, as shown in FIG. 3. The basic dye taken in between layers of the smectite based clay mineral 1 forms an ion bond with the smectite based clay mineral 1 and is rigidly fixed to the receptor layer.

As is clear from the above description, according to the present invention, the basic dye can be employed as the image forming material of the thermal transfer system, and thus image formation satisfactory in sensitivity or density, hue and light fastness can be achieved. At this point, it is not necessary to process the basic dye so as to be hydrophobic in advance, and simply adding the solubilizing agent suffices. Therefore, the production process for the ink composition and the ink ribbon for thermal transfer can be simplified advantageously for manufacturing.

The thermal transfer target sheet according to the present invention has the receptor layer containing the interlayer compound substituted by ions exchangeable with the basic dye. Therefore, when the basic dye contained in the above-mentioned ink ribbon for thermal transfer is thermally transferred, the basic dye can be rigidly fixed, assuring the sufficient fixation. Accordingly, with the satisfactory property of the basic dye, clear, high definition image formation is possible.

BEST MODE FOR CARRYING OUT THE INVENTION

Preferred embodiments of the present invention will now be described in detail with reference to specific experiment results.

Embodiment 1

Using an azo based cationic dye for dyeing acrylic fibers, Kayacryl Red GRL (trade name) produced by Nippon Kayaku, processed with Soxhlet extraction with ethanol for eliminating additives, such as sodium sulfate, an ink ribbon for thermal transfer was produced in the following manner.

The azo based cationic dye used in this case is C.I. Basic Red 46, with its structure shown by Chemical Formula 4.

Figure 1:
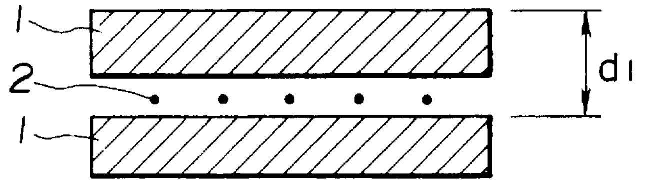
FIG. 1 is a diagram showing the structure of saponite.
Figure 2:
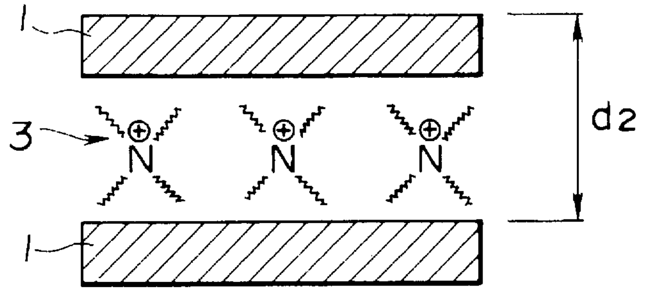
FIG. 2 is a diagram showing saponite substituted by a quaternary ammonium ion.
Figure 3:
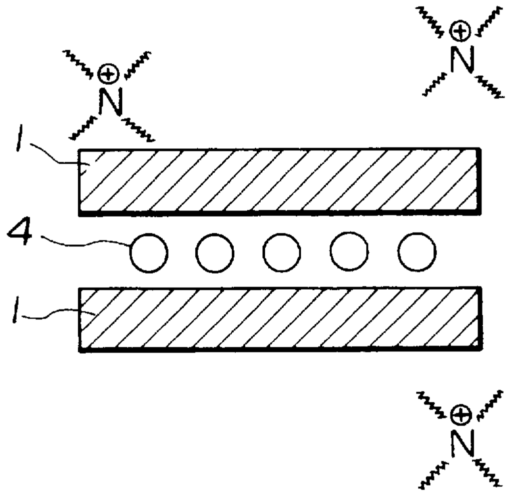
FIG. 3 is a diagram showing saponite ion-exchanged with a cationic dye.
Figure 4:
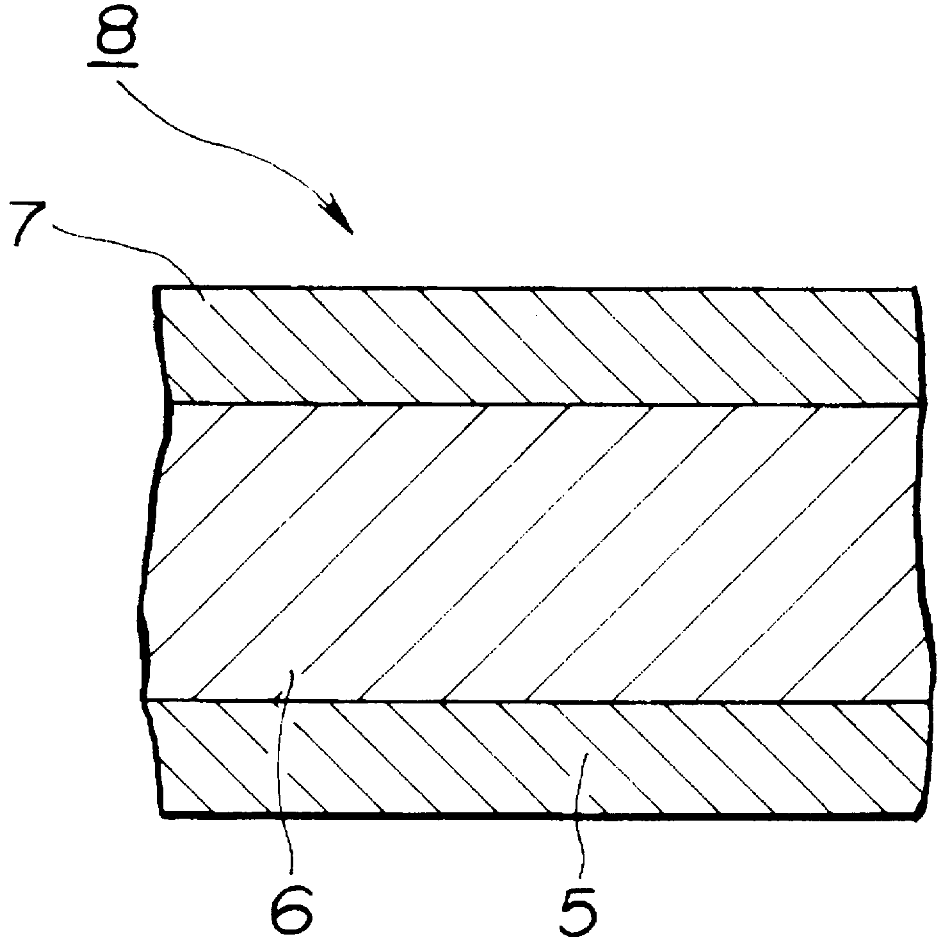
FIG. 4 is an enlarged cross-sectional view showing essential portions of an example of an ink ribbon for thermal transfer.

A polyethylene terephthalate (PET) film, 6 μm in thickness and provided with a heat-resistant smooth layer 5 on one side thereof, was used as a base 6. On the surface opposite to the side having the heat-resistant smooth layer 5 of the base 6, an ink composition for thermal transfer of the following composition was applied at a rate of 25 $g/m^2$ by wire bar coating, and was dried. Thus, an ink ribbon for thermal transfer 8 having an ink layer 7 approximately 1 μm in thickness formed on the base (PET film) 6 was produced, as shown in FIG. 4.

Ink composition for thermal transfer:

cationic dye 1 part by weight binder resin polyvinyl butyral (6000C-S, produced by Denki Kagaku Kogyo) 2 parts by weight solubilizing agent polyoxyethylene alkylphenylether (NP-20, HLB value=35, produced by Nikko Chemical) 2 parts by weight methylethylketone/toluene (1/1 by weight) 24 parts by weight A thermal transfer target sheet was produced as follows. First, a solution containing a vinylchloride-acrylic copolymer, S-LEC E-C130, produced by Sekisui Chemical, at the following ratio by weight was prepared as a coating stock solution 1.

Composition of the Coating Stock Solution 1 vinylchloride-acrylic copolymer 100 parts by weight silicon oil (SF 8427, produced by Toray-Dow Corning-Silicone) 2 parts by weight methylethylketone/toluene (1/1 by weight) 500 parts by weight A quaternary ammonium substituted montmorillonite was dispersed by ultrasonic dispersion and was swollen into a mixed solvent, with the following composition by weight. The resulting solution was used as a coating stock solution 2.

Composition of the Coating Stock Solution 2 tetra-n-octylammonium substituted montmorillonite 50 parts by weight methylethylketone/toluene (1/1 by weight) 500 parts by weight A method of producing the tetra-n-octylammonium montmorillonite is as follows.

20 g of montmorillonite was dispersed and swollen into 1 liter of water. Ethanol of an amount equivalent to that of the disperse solution was added thereto, and then 200 cc of ethanol with 10.9 g (equivalent to 20 mg) of tetra-n-octylammonium bromide was dropped into the disperse solution while it was agitated. Consequently, particles were flocculated and precipitated.

The disperse solution was left for one week, and the precipitate was filtered out and washed with a large amount of ethanol for removing the quaternary ammonium salt which had not reacted. Then, the washed precipitate was dried at room temperatures under reduced pressures, thus forming ashy powder. The interplanar distance of the (001) plane, that is, the interlayer distance, of this powder was 19.6 Å as measured by powder X-ray diffraction analysis. This interplanar distance was extended by 9.8 Å from the interplanar distance of 9.8 Å of the initial untreated montmorillonite.

The coating stock solution 1 and the coating stock solution 2 were mixed at an equal ratio by weight, and were dispersed by ball mill agitation. The resulting solution was used as the coating solution.

This coating solution was applied with a doctor blade onto a white polyester film 125 μm in thickness, and was dried at 60° C. under reduced pressures for 30 minutes.

Thus, the thermal transfer target sheet having a receptor layer with a thickness of approximately 5 μm on the drying was produced. Then, in order to improve the surface property, the thermal transfer target sheet was heated and pressed, thus producing a transparent receptor layer of glossy light yellow.

The ink ribbon for thermal transfer produced in the above process was set in a ribbon cassette, not shown, and printing was carried out on the above thermal transfer target sheet using a color video printer, CVP-G500 (trade name), produced by Sony Corporation. Consequently, an image exhibiting a satisfactory hue of Cyan and sufficient gradation was produced. The maximum density (O.D) was 1.2.

In addition, a toluene swelling agent was sprayed onto the image. After the image was left for a few minutes, excess toluene was wiped off. The fixing rate of this image found through a solvent soaking test was raised to approximately 40% to 98%.

The solvent soaking test was conducted as follows.

A part of the recording image was introduced into methylethylketone/toluene at a ratio of 1/1 by weight, which is a solvent for producing the receptor layer, at room temperatures and was left for 15 hours. The ratio of the O.D values indicating reflection densities before and after the introduction was calculated as the fixing rate.

Fixing rate=(O.D value after introduction)/(O.D value before introduction)×100 (%)

Comparatively, the ink composition of the composition having the solubilizing agent removed therefrom was prepared and used for producing an ink ribbon for thermal transfer. Then, an image was similarly formed. The maximum density was 0.3. In addition, a solid dye material existed on the ink ribbon for thermal transfer and in the receptor layer printing section, indicating insufficiency of dissolution or dispersion of the dye. The resulting maximum density and quality of the image were far from practical levels.

Embodiment 2

An ink ribbon for thermal transfer was produced for three types of binder resins in a manner similar to Embodiment 1, using a refined oxazine based cationic dye, C.I. Basic Blue 75 having the structure shown by Chemical Formula 1, that is, Aizen Cathilon Blue 3GLH (trade name), produced by Hodogaya Kagaku Kogyo. The improvement in coloring density was investigated by printing on a thermal transfer target sheet formed of a receptor layer of the following composition. The result is shown in Table 1.

Thermal transfer Target Sheet

A solution containing a vinylidenechloride-acrylonitrile copolymer, a reagent produced by Aldrich, at the following weight ratio was prepared as a coating stock solution 1.

Composition of the Coating Stock Solution 1 copolymer 100 parts by weight silicon oil (SF 8427, produced by Toray-Dow Corning-Silicone) 2 parts by weight methylethylketone 500 parts by weight Also, quaternary ammonium substitution smectite was dispersed by ultrasonic dispersion and was swollen into a mixed solvent at the following ratio by weight. The resulting solution was used as a coating stock solution 2.

Composition of the Coating Stock Solution 2 tetra-n-decylammonium substituted synthetic smectite 50 parts by weight methylethylketone 500 parts by weight A method of producing the tetra-n-decylammonium substituted smectite is as follows.

20 g of synthetic saponite, Smecton SA (trade name), Kinumine Kogyo, was dispersed and swollen in 1 liter of water. Ethanol of an amount equivalent to that of the disperse solution was added thereto, and 13.2 g (equivalent to 20 mg) of tetra-n-decylammonium bromide dissolved into 200 cc of ethanol was dropped into the disperse solution while it was agitated. After the solution was left for one week, particles were flocculated and precipitated. However, the precipitation speed was lower than in the case of synthetic saponite.

The precipitate was filtered out from the disperse solution, and was washed with a large amount of ethanol for removing quaternary ammonium salt which had not reacted.

Then, the washed precipitate was dried at room temperatures under reduced pressures, producing a pure white powder. The interplanar distance of the (001) plane, that is, the interlayer distance, of this powder measured by powder X-ray diffraction analysis was 21.96 Å, which was extended by 9.32 Å from the interplanar distance of 12.64 Å of the untreated synthetic saponite.

The coating stock solution 1 and the coating stock solution 2 were mixed at an equal ratio by weight, and were dispersed by ball mill agitation to form a coating solution.

The coating solution was applied with a doctor blade onto a synthetic paper having a thickness of 60 μm, and was dried at 60° C. under reduced pressures for 30 minutes.

Thus, a thermal transfer target sheet having a film with a thickness of approximately 5 μm on the drying as the receptor layer was produced. Then, in order to improve the surface property, the thermal transfer target sheet was heated and pressed, thus forming a glossy colorless transparent receptor layer.

TABLE 1

| | | Solubilizing Agent | | Additive/ | Dye/ | |
|---|---|---|---|---|---|---|
| Binder | Solvent | Type | HLB value | Dye Ratio | Binder Ratio | Maximum Density |
| HPC | EtOH | None | — | | 0.5 | 0.76 |
| | | AOT | 66.3 | 1.0 | 0.5 | 1.44 |
| | | n-DBS | 54.3 | 1.0 | 0.5 | 1.20 |
| EHEC | EtOH | None | — | | 1.0 | 0.56 |
| | | AOT | 66.3 | 1.0 | 1.0 | 1.55 |
| | | AOT | 66.3 | 1.5 | 0.5 | 1.64 |
| | | AOT | 66.3 | 2.0 | 0.5 | 1.70 |
| 6000C-S | MEK/toluene | None | — | | 1.0 | 0.37 |
| | | n-DBS | 54.3 | 1.0 | 0.5 | 1.10 |
| | | DS—Na | 51.4 | 1.0 | 0.5 | 0.74 |
| | | NP-20 | 3.5 | 1.0 | 0.5 | 0.35 |

HPC: hydroxypropyl cellulose
EHEC: ethyl hydroxyethyl cellulose
AOT: monosodium diethylhexylsulfosaxinate
n-DBS: n-dodecylbenzene sulfonic acid
DS—Na: sodium n-dodecylsulfate As seen from the results in Table 1, when hydroxypropyl cellulose (HPC) as a binder and ethyl alcohol (EtOH) as a solvent are used, the maximum density is 0.76 if the solubilizing agent is not added. On the other hand, if monosodium diethylhexylsulfosaxinate (AOT) and n-dodecylbenzene sulfonic acid (n-DBS) are used as the solubilizing agents, the maximum density are 1.44 and 1.20, respectively. These values of the maximum density indicate sufficient practical durability. Then, when ethyl hydroxyethyl cellulose (EHEC) as the binder and EtOh as the solvent are used, the maximum density is 0.56 if the solubilizing agent is not added. On the other hand, if AOT is added by an increasing amounts of 1.0, 1.5 and 2.0 as expressed by the ratio of the amount of additive/dye, the maximum density is increased to 1.55, 1.64 and 1.70, respectively. These values of the maximum density indicate sufficient practical durability.

In addition, when polyvinyl butyral (6000C-S) as the binder and a methylethylketone/toluene mixed solvent as the solvent are used, the maximum density is 0.37 if the solubilizing agent is not added. On the other hand, if n-DBS, sodium n-dodecylsulfate (DS-Na) and polyoxyethylene alkylphenylether (NP-20) are added, high maximum densities of 1.10, 0.74 and 0.90 are obtained.

Embodiment 3

An ink ribbon for thermal transfer was produced in a manner similar to Embodiment 2, using the cationic dye shown in Chemical Formula 3. By using the ink ribbon thus produced, printing was carried out on the thermal transfer target sheet similar to that of Embodiment 2, and the improvement of coloring density was investigated. The result is shown in Table 2.

TABLE 2

| | | Solubilizing Agent | | Additive/ | Dye/ | |
|---|---|---|---|---|---|---|
| Binder | Solvent | Type | HLB value | Dye Ratio | Binder Ratio | Maximum Density |
| HPC | EtOH | None | — | | 0.5 | 0.35 |
| | | AOT | 66.3 | 1.0 | 0.5 | 1.11 |

HPC: hydroxypropyl cellulose
AOT: monosodium diethylhexylsulfosaxinate

Embodiment 4

An ink ribbon for thermal transfer was produced in a manner similar to Embodiment 2, using the cationic dye shown in Chemical Formula 6. By using the ink ribbon thus produced, printing was carried out on the thermal transfer target sheet similar to that of Embodiment 2, and the improvement of coloring density was investigated. The result is shown in Table 3.

TABLE 3

| | | Solubilizing Agent | | Additive/ | Dye/ | |
|---|---|---|---|---|---|---|
| Binder | Solvent | Type | HLB value | Dye Ratio | Binder Ratio | Maximum Density |
| EHEC | EtOH | None | — | | 0.5 | 0.62 |
| | | AOT | 66.3 | 1.0 | 0.5 | 1.03 |

EHEC: ethyl hydroxyethyl cellulose
AOT: monosodium diethylhexylsulfosaxinate

Embodiment 5

An ink ribbon for thermal transfer was produced in a manner similar to Embodiment 2, using the cationic dye shown in Chemical Formula 7. By using the ink ribbon thus produced, printing was carried out on the thermal transfer target sheet similar to that of Embodiment 2, and the improvement of coloring density was investigated. The result is shown in Table 4.

TABLE 4

| | | Solubilizing Agent | | Additive/ | Dye/ | |
|---|---|---|---|---|---|---|
| Binder | Solvent | Type | HLB value | Dye Ratio | Binder Ratio | Maximum Density |
| HPC | EtOH | None | — | | 0.5 | 0.44 |
| | | n-DBS | 54.3 | 1.0 | 0.5 | 0.87 |

HPC: hydroxypropyl cellulose
n-DBS: n-dodecylbenzene sulfonic acid

Embodiment 6

An ink ribbon for thermal transfer was produced in a manner similar to Embodiment 2, using the cationic dye shown in Chemical Formula 8 and three kinds of solubilizing agents. By using the ink ribbon thus produced, printing was carried out on the thermal transfer target sheet similar to that of Embodiment 2, and the improvement of coloring density was investigated. The result is shown in Table 5.

TABLE 5

| Binder | Solvent | Solubilizing Agent Type | Solubilizing Agent HLB value | Additive/ Dye Ratio | Dye/ Binder Ratio | Maximum Density |
|---|---|---|---|---|---|---|
| 6000C-S | MEK/ toluene | None | — | | | 0.22 |
| | | n-DBS | 54.3 | 0.5 | 0.5 | 0.36 |
| | | DS—Na | 51.4 | 1.0 | 0.5 | 0.77 |
| | | NP-20 | 3.5 | 1.0 | 0.5 | 0.20 |

n-DBS: n-dodecylbenzene sulfonic acid
DS—Na: sodium n-dodecylsulfate

Embodiment 7

An ink ribbon for thermal transfer was produced in a manner similar to Embodiment 2, using the cationic dye shown in Chemical Formula 2. By using the ink ribbon thus produced, printing was carried out on the thermal transfer target sheet similar to that of Embodiment 2, and the improvement of coloring density was investigated. The result is shown in Table 6.

TABLE 6

| Binder | Solvent | Solubilizing Agent Type | Solubilizing Agent HLB value | Additive/ Dye Ratio | Dye/ Binder Ratio | Maximum Density |
|---|---|---|---|---|---|---|
| HPC | EtOH | None | — | | 0.5 | 0.46 |
| | | AOT | 66.3 | 1.0 | 0.5 | 0.70 |

HPC: hydroxypropyl cellulose
AOT: monosodium diethylhexylsulfosaxinate

Embodiment 8

An ink ribbon for thermal transfer was produced in a manner similar to Embodiment 2, using the cationic dye shown in Chemical Formula 5. By using the ink ribbon thus produced, printing was carried out on the thermal transfer target sheet similar to that of Embodiment 2, and the improvement of coloring density was investigated. The result is shown in Table 7.

TABLE 7

| Binder | Solvent | Solubilizing Agent Type | Solubilizing Agent HLB value | Additive/ Dye Ratio | Dye/ Binder Ratio | Maximum Density |
|---|---|---|---|---|---|---|
| EHEC | EtOH | None | — | | 0.5 | 0.31 |
| | | AOT | 66.3 | 1.0 | 0.5 | 0.57 |

TABLE 7-continued

| Binder | Solvent | Solubilizing Agent Type | Solubilizing Agent HLB value | Additive/ Dye Ratio | Dye/ Binder Ratio | Maximum Density |
|---|---|---|---|---|---|---|

EHEC: ethyl hydroxyethyl cellulose
AOT: monosodium diethylhexylsulfosaxinate

Embodiment 9

An ink ribbon for thermal transfer was produced in a manner similar to Embodiment 2, using C.I. Basic Yellow 21. By using the ink ribbon thus produced, printing was carried out on the thermal transfer target sheet similar to that of Embodiment 2, and the improvement of coloring density was investigated. The result is shown in Table 8.

TABLE 8

| Binder | Solvent | Solubilizing Agent Type | Solubilizing Agent HLB value | Additive/ Dye Ratio | Dye/ Binder Ratio | Maximum Density |
|---|---|---|---|---|---|---|
| 6000C-S | MEK/ toluene | None | — | | | 0.15 |
| | | n-DBS | 54.3 | 0.5 | 0.5 | 0.63 |

n-DBS: n-dodecylbenzene sulfonic acid

In each of the embodiments, the coloring density was high when the solubilizing agent was used.

We claim:

1. An ink composition for thermal transfer comprising:

(a) a water soluble cationic dye;

(b) a thermoplastic polymer binder resin selected from the group consisting of polyvinyl-butyral, hydroxypropyl cellulose and ethyl hydroxyethyl cellulose resins;

(c) a solubilizing compound compatible with the cationic dye and the thermoplastic binder resin having an HLB value of from about 7.0 to about 90 and selected from the group consisting of: polyoxyethylene alkylphenylether, monosodium diethylhexylsulfosaxinate, n-dodecylbensenesulfonic acid and sodium n-dodecylsulfate; and (d) an organic solvent;

the weight ratio of component (c) to component (a) being from about 1:1 to about 2:1, respectively.

2. An ink composition as defined in claim 1, wherein the weight ratio of the cationic dye component (a) to the resin binder component (b) is from about 0.5:1 to about 1:1, respectively.

3. An ink composition as defined in claim 1, wherein the resin binder is polyvinyl butyral and the organic solvent is a mixture of methylethylketone/toluene in a weight ratio of about 1/1.

4. An ink composition as defined in claim 1, wherein the resin binder is hydroxypropyl cellulose and the organic solvent is ethanol.

5. An ink composition as defined in claim 1, wherein the resin binder is ethylhydroxyethyl cellulose and the organic solvent is ethanol.

* * * * *